United States Patent
Zitnick et al.

(10) Patent No.: US 8,781,250 B2
(45) Date of Patent: Jul. 15, 2014

(54) IMAGE DECONVOLUTION USING COLOR PRIORS

(75) Inventors: Charles Lawrence Zitnick, Seattle, WA (US); Neel Joshi, La Jolla, CA (US); Richard Szeliski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1309 days.

(21) Appl. No.: 12/146,605

(22) Filed: Jun. 26, 2008

(65) Prior Publication Data

US 2009/0324126 A1    Dec. 31, 2009

(51) Int. Cl.
G06K 9/36    (2006.01)

(52) U.S. Cl.
USPC ........... 382/275; 382/226; 382/264; 382/255; 348/208.4; 348/208.6

(58) Field of Classification Search
CPC ............... G06T 5/003; G06T 2207/10024; G06T 5/50; G06T 2207/20008; G06T 5/001
USPC ......... 382/275, 165, 167, 255, 270, 294, 199, 382/264, 260, 278, 274, 254, 162, 300, 280, 382/296; 348/607, E05.001, 208.14, 208.4, 348/208.99, 208.1, 208.6, 241, 208.3, 348/208.5, 208.7, 222.1, E05.024, E09.002, 348/208.2, E05.031, E05.037; 235/462.01, 235/462.41
See application file for complete search history.

(56) References Cited

U.S. PATENT DOCUMENTS

| | | | |
|---|---|---|---|
| 5,506,699 A * | 4/1996 | Wong | 358/3.08 |
| 5,512,956 A * | 4/1996 | Yan | 348/606 |
| 6,438,270 B1 | 8/2002 | Harrington | |
| 6,600,491 B1 * | 7/2003 | Szeliski et al. | 345/473 |
| 7,317,843 B2 * | 1/2008 | Sun et al. | 382/274 |
| 7,324,687 B2 * | 1/2008 | Zitnick et al. | 382/154 |
| 7,379,583 B2 * | 5/2008 | Zitnick et al. | 382/154 |
| 7,706,609 B2 * | 4/2010 | Bennett et al. | 382/167 |
| 8,249,377 B1 * | 8/2012 | Banner et al. | 382/255 |
| 8,390,704 B2 * | 3/2013 | Wang et al. | 348/248 |
| 2002/0118883 A1 | 8/2002 | Bhatt | |
| 2004/0184675 A1 | 9/2004 | Brown | |
| 2005/0220359 A1 | 10/2005 | Sun et al. | |
| 2006/0093234 A1 | 5/2006 | Silverstein | |
| 2006/0125938 A1 | 6/2006 | Ben-Ezra et al. | |
| 2007/0036461 A1 | 2/2007 | Atherton | |
| 2007/0177033 A1 | 8/2007 | Bennett et al. | |
| 2007/0177817 A1 * | 8/2007 | Szeliski et al. | 382/275 |

(Continued)

OTHER PUBLICATIONS

Liu et al., "Noise Estimation from a Single Image", MIT Lecture note, published in 2006, 34 pp.*

(Continued)

Primary Examiner — Mekonen Bekele
(74) Attorney, Agent, or Firm — Steve Wright; Carole Boelitz; Micky Minhas (57) ABSTRACT

Described are techniques for image deconvolution to deblur an image given a blur kernel. Localized color statistics derived from the image to be deblurred serve as a prior constraint during deconvolution. A pixel's color is formulated as a linear combination of the two most prevalent colors within a neighborhood of the pixel. This may be repeated for many or all pixels in an image. The linear combinations of the pixels serve as a two-color prior for deconvolving the blurred image. The two-color prior is responsive to the content of the image and it may decouple edge sharpness from edge strength.

21 Claims, 5 Drawing Sheets

(56) References Cited

U.S. PATENT DOCUMENTS

| | | | |
|---|---|---|---|
| 2007/0223831 | A1 | 9/2007 | Mei et al. |
| 2007/0236574 | A1 | 10/2007 | Alon et al. |
| 2007/0258707 | A1 | 11/2007 | Raskar |
| 2008/0025627 | A1* | 1/2008 | Freeman et al. .............. 382/255 |
| 2008/0095466 | A1 | 4/2008 | Kinrot et al. |
| 2008/0240607 | A1* | 10/2008 | Sun et al. ...................... 382/275 |
| 2009/0316995 | A1* | 12/2009 | Szeliski et al. ................ 382/199 |
| 2009/0324126 | A1* | 12/2009 | Zitnick et al. ................ 382/275 |

OTHER PUBLICATIONS

Bennett et al., "Video and Image Bayesian Demosaicing with a Two Color Image Prior".*

Jia Jiaya, Single Image Motion Deblurring Using Transparency, IEEE 2007, Issue Date: Jun. 17-22, 2007.*

S-H Wo Minimum Entropy deconvolution for restoration of blurred two-tone images, Electronics Letters Jul. 19, 1990 vol. 26 No. 15.*

Liu et al., "Noise Estimation from a Single Image", MIT Lecture note, published in 2006, 34 pages.*

Li et al, , "Deblurring Two-Tone Images by a Joint Estimation Approach Using Higher-Order Statistics" ,IEEE SP Workshop on Higher-Order Statistics, Banff, Canada, Jul. 21-23, 1997, pp. 108-111.*

S-H Wo (hereafter Wo), "Minimum Entropy deconvolution for restoration of blurred two-tone images", Electronics letter, Jul. 19, 1990, pp. 1183-1184.*

Bennett et al.,"Video and Image Bayesian Demosaicing With a Two Color Image Prior", Ninth European Conference on Computer Vision (ECCV 2006), pp. 508-521.*

Bennett et al., "Video and Image Bayesian Demosaicing With A Two Color Image Prior", In Seventh European Conference on Computer Vision (ECCV 2002), vol. 1,Graz, May 2006. Springer-Verlag, 6 pages.

Trimeche et al., "Multichannel image deblurring of raw color components", Proceedings of the SPIE, vol. 5674, pp. 169-178 (2005).

Raskar et al., "Coded Exposure Photography: Motion Deblurring using Fluttered Shutter", ACM Transactions on Graphics (TOG), ISSN: 0730-0301, vol. 25, Issue 3, Jul. 2006, pp. 795-804.

"International Search Report", Mailed Date: Jan. 22, 2010, Application No. PCT/US2009/047152, Filed Date: Jun. 12, 2009, pp. 10.

Levin, et al., "A Closed-Form Solution to Natural Image Matting", Retrieved at << http://www.wisdom.weizmann.ac.il/~levina/papers/Matting-Levin-Lischinski-Weiss-CVPR06.pdf >>, IEEE Transactions on Pattern Analysis and Machine Intelligence, vol. 30, No. 2, Feb. 2008, pp. 228-242.

* cited by examiner

IMAGE DECONVOLUTION USING COLOR PRIORS

BACKGROUND

A common problem in photography is image blur, which can be caused by combinations of camera shake during long exposure times, subject movement, the use of large apertures in low light settings, or limited camera resolution. Regardless of the cause, image blur is usually undesirable.

Figure 1:
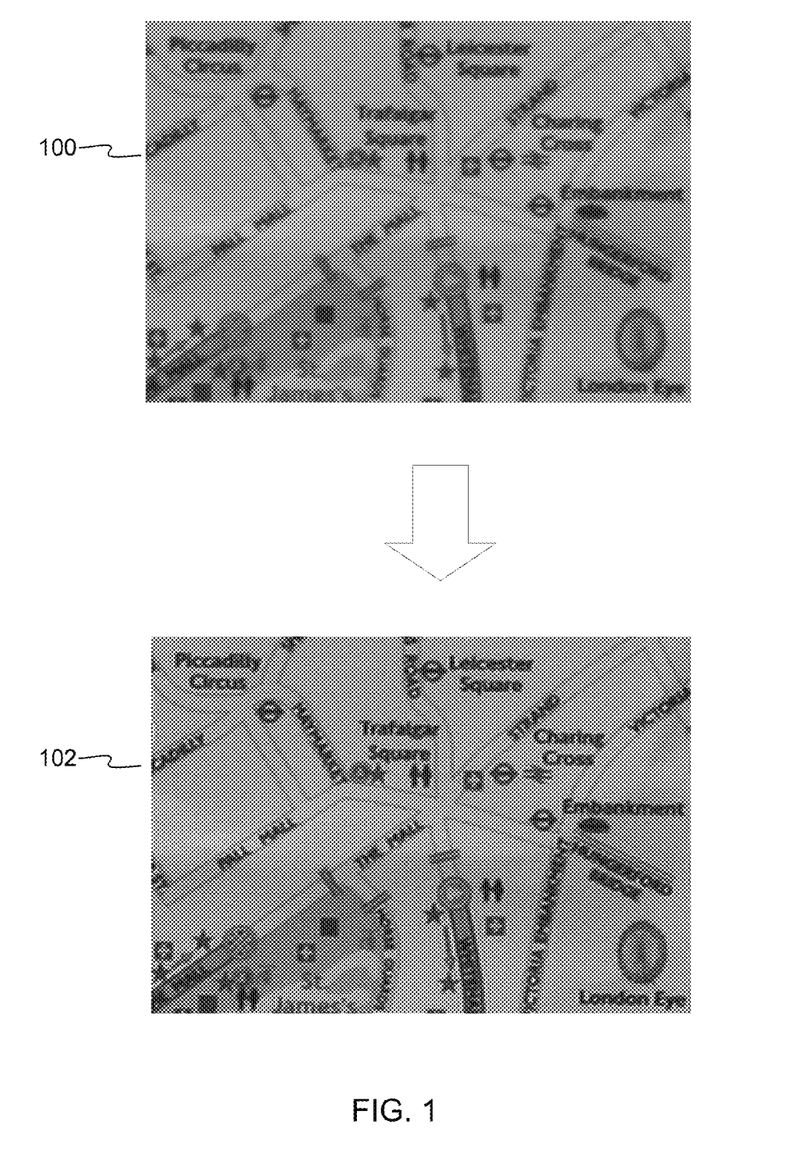
FIG. 1 shows a blurred image subjected to a deblurring process to produce a deblurred image.

With the advent of digital photography, it has become possible to reduce or correct the blur in an image. FIG. 1 shows a blurred image subjected to a deblurring process to produce a deblurred image 102. Various approaches have been used to find a deblurred image such as image 102. Some have tried modifying how images are captured. Some have used the added information of multiple images to reduce blur. Up-sampling algorithms have been used to reduce the blur from limited camera resolution. Blur kernels determined from a single image have also been used. Non-blind deconvolution has also been explored but with limited success.

Non-blind image deconvolution involves recovering a sharp image from an input image corrupted by blurring and noise, where the blurring is a product of convolution the true (unblurred) image with a known kernel at a known noise level. Previous deconvolution approaches to deblurring have often been limited to special applications, are often not effective with arbitrary images, and sometimes generate unwanted artifacts such as ringing. Some have used image priors derived from natural image statistics. Others have used graph cuts to reduce over-smoothing. Deconvolution with multiple blurs and energy minimization have also been used.

Techniques described below relate to efficiently and reliably deblurring images using deconvolution.

SUMMARY

The following summary is included only to introduce some concepts discussed in the Detailed Description below. This summary is not comprehensive and is not intended to delineate the scope of the claimed subject matter, which is set forth by the claims presented at the end.

Described are techniques for image deconvolution to deblur an image given a blur kernel. Localized color statistics derived from the image to be deblurred serve as a prior constraint during deconvolution. A pixel's color is formulated as a linear combination of the two most prevalent colors within a neighborhood of the pixel. This may be repeated for many or all pixels in an image. The linear combinations of the pixels serve as a two-color prior for deconvolving the blurred image. The two-color prior is responsive to the content of the image and it may decouple edge sharpness from edge strength.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

The following description begins with some discussion of deconvolution theory and models used for deblurring. Image priors are described next, followed by discussion of gradient priors and color priors. This is followed with a discussion on color models and how to use them to find the colors to be used as the color priors.

Details of the technique described herein may be better understood in view of the following general observations about photographic images and a resulting image model. Globally, most images have a relatively limited set of distinct colors. Furthermore, most small neighborhoods or locales in an image can be described by an even smaller set of colors and, often even as few as two colors will suffice. An image to be deblurred can be modeled as a linear combination of two colors per-pixel (i.e., each pixel is a linear combination of two colors that vary for different pixels). In other words, the image may be thought of as a pixel-by-pixel blend, per a varying blending parameter (i.e., alpha) of two color layers. The two color layers may be piecewise smooth, yet the blending parameter between them can change. Changes in the blending parameter can account for texture and sharp edges in the image, and constituent colors of the image are assumed to vary smoothly. This piecewise-smooth two-color model can model strong edges, reduce noise in the image, and lead to very reasonable deblurred images. How this color model is used in deconvolution for deblurring will become apparent with further explanation.

Deconvolution

Image deconvolution is a process of recovering a sharp image from a blurred input image where the image's blur is presumed to be a result of convolution of the image with a known blur kernel and where a level of noise is known. A blur kernel is usually a two-dimensional image or array of numbers which when convolved (repeated multiplication and summation-stepped over the pixels of an image) with the desired sharp/true image produces what was seen or imaged. The blur kernel may be shift-invariant. Image deconvolution can be formulated, among other ways, using a Bayesian framework solved using a maximum a posteriori (MAP) estimation technique. In MAP estimation for deconvolution, the most likely estimate for the blurred image's sharp image I (the blurred image's theoretical unblurred version) is sought using a given observed blurred image, B, a blur kernel, K, and an image formation model. This is expressed as a maximization over the probability distribution of the posteriori, using Bayes' rule. The result is expressed as minimization of a sum of negative log likelihoods:

$$P(I/B) = P(B/I)P(I)/P(B) \qquad (1)$$

$$\mathrm{argmax}_I P(I/B) = \mathrm{argmin}_I - [L(B/I) + L(I)]. \qquad (2)$$

The problem of deconvolution is now reduced to defining the log likelihood terms.

Given the image formation model, with an additive Gaussian white noise process:

$$B = I \otimes K + N, \tag{3}$$

where $N \sim N(\sigma^2)$, the "data" log likelihood is:

$$L(B/I) = -\|B - I \otimes K\|^2 / \sigma^2. \tag{4}$$

The form of the remaining log likelihood term, L(I), depends on the image prior that is used. The image prior describes (as a probability distribution) the likelihood of a particular image being seen in the world (i.e., being "realistic"). For example, images consisting of purely random pixels are highly unlikely. Many commonly used priors encourage local smoothness, i.e., penalize differences between adjacent pixels. In our work, we use the deviation of a pixel's color from a local two-color model as the measure of its likelihood.

Image Priors

As discussed earlier, when deconvolving an image, the data likelihood is inherently ambiguous, i.e., there are many possible "sharp" images that will blur to match the observed blurred image, and the greater the blur, the larger the range of ambiguity. An image prior is used to help disambiguate these solutions. An image prior can be thought of as one or more constraints that the sharp image must satisfy. One approach is to assume that the sharp image is smooth or piecewise smooth, resulting in priors on image gradients. While gradient priors have been used for some time, they will be briefly explained to provide an example of what an image prior is and how it can be used. Color priors will be explained later.

Gradient Priors

An image prior can be obtained by assuming the image is formed from a Markov random field (MRF) process, and thus the value of an individual pixel is conditionally dependent on the pixel values in a local neighborhood of the individual pixel (e.g., a pixel's 4 immediate neighbors). If the image is expected to be locally smooth, the MRF property can be imposed using a smoothness prior, which penalizes large image gradients (steep changes) and thus biases pixels to take on values similar to their neighbors: $L(I) = -\lambda \|\nabla I\|^2$, where $\lambda$ is a regularization parameter to control the weight of the smoothness penalty. This type of prior disambiguates the solution, but can result in an overly-smooth solution. A power of 0.8 (in $L(I) = -\lambda \|\nabla I\|^{0.8}$ can reduce this problem (see A. Levin et al.; "Image and depth from a conventional camera with a coded aperture"; SIGGRAPH '07: ACM SIGGRAPH 2007 papers; ACM Press). In this case the penalty function is no longer quadratic, and minimization is performed using iterative reweighted least-squares.

As noted, deconvolution using gradient priors has several drawbacks. To varying degrees, a gradient prior is in effect a "smoothness prior"; a penalty function that drives the deblurred image towards a flat image. Sharp edges do not deblur well. Also, if there is significant image noise, edges from noise tend to be incorrectly preserved as textured noise.

Color Priors

Figure 2:
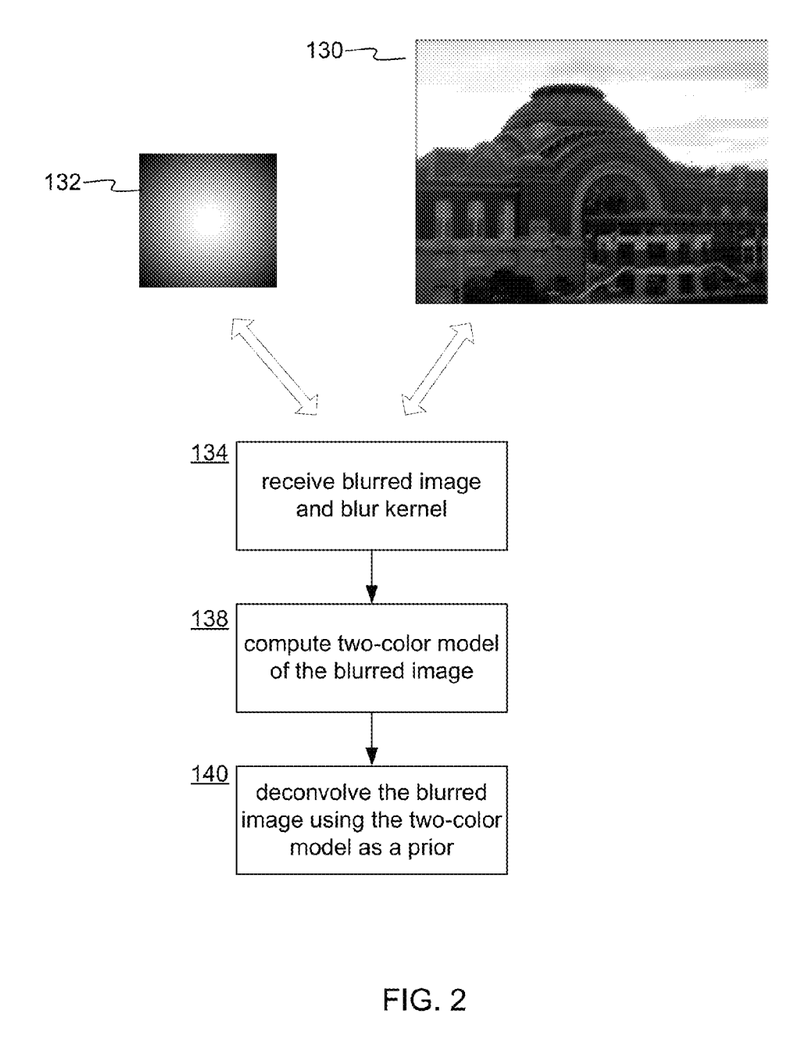
FIG. 2 shows a general process for deblurring with a two-color model.

Most photographs, whether of nature, people, or man-made objects are globally composed of relatively limited sets of colors. That is, the number of colors in a photograph is small relative to the number of humanly discernible colors. Furthermore, thinking of an image in terms of small sub-images (or local neighborhoods), an image can be described at a local level by even smaller sets of colors. Usually, a mixture of as few as two colors can reasonably describe image data within a small local neighborhood (see E. Bennett et al.; "Video and image Bayesian demosaicing with a two color image prior"; Ninth European Conference on Computer Vision (ECCV 2006), volume 1; May 2006; Springer-Verlag; and C. Liu et al.; "Automatic estimation and removal of noise from a single image"; IEEE Transactions on Pattern Analysis and Machine Intelligence, 2007). For example, a pixel's color can be described as a linear combination of the two predominant colors (or means thereof) in its local neighborhood. Priors for image deconvolution can be derived from these properties. Specifically, an image can be found where each pixel is composed of a linear mixture of two colors which are drawn from a small number of globally distinct colors, such that when the image is convolved with a known blur kernel it best matches the blurred input image. FIG. 2 shows a general process for deblurring with a two-color model. A blurred image 130 and a blur kernel 132 are received 132. The two-color model is computed 138 from the blurred image 130. The blurred image and the two-color model are used as a prior to deconvolve the blurred image to produce a deblurred image; an analogue of the blurred image 130 but with less blur. The blur kernel 132 can be obtained by various known measures. For example, see U.S. patent application Ser. No. 12/143,837, titled "BLUR ESTIMATION", filed Jun. 23, 2008.

Returning to the two-color model, the model assumes that any pixel's color can be represented as a linear combination of two colors, where these colors are piecewise smooth and can be derived from local properties (properties of the pixel's neighborhood):

$$I = \alpha P + (1 - \alpha) S \tag{5}$$

where P and S are primary and secondary colors, respectively, and $\alpha$ is the linear mixing parameter. For notational convenience, the primary color $P_i$ is assigned to the color that lies closest to the pixel i's color $I_i$. Some pixels may only be described by a single color, in which case $P_i = S_i$.

The two-color model can have several benefits as an image prior for deconvolution. Given the two colors for a pixel, the space of unknowns is reduced from three dimensions (RGB) to one ($\alpha$). The $\alpha$ parameter provides an alternative for parameterizing edges, where edge sharpness is decoupled from edge intensity—a single pixel transition in $\alpha$ from $\alpha = 1$ to $\alpha = 0$ indicates a step edge (a primary color pixel next to a secondary color pixel) regardless of the intensity of the edge. Thus, an edge's strength can be controlled with a prior on $\alpha$ while maintaining local smoothness using a separate prior on P and S. The two-color model can also capture local color statistics, which can provide a constraint during deconvolution. These constraints help reduce over-smoothing around "bar edges" and high-frequency texture. Using the two-color prior may penalize smooth edges (of potential solutions) over sharp edges in a way that doesn't depend on the magnitude of the edge.

Furthermore, the two-color model can possibly result in higher intensity edges if such edges are more consistent with local color statistics. The two-color model is built from local image statistics and estimates two dominant colors in a neighborhood around each pixel. The primary and secondary colors for a pixel can be estimated by using a robust expectation maximization (EM) clustering algorithm in a local neighborhood around each pixel. If the local variance is lower than the noise variance $\sigma^2$ of a pixel, the pixel is modeled by one color (P or S), otherwise it is marked as a two color pixel. If this approach is used, a binary variable or bit indicating one or two colors is stored for each pixel.

Figure 3:
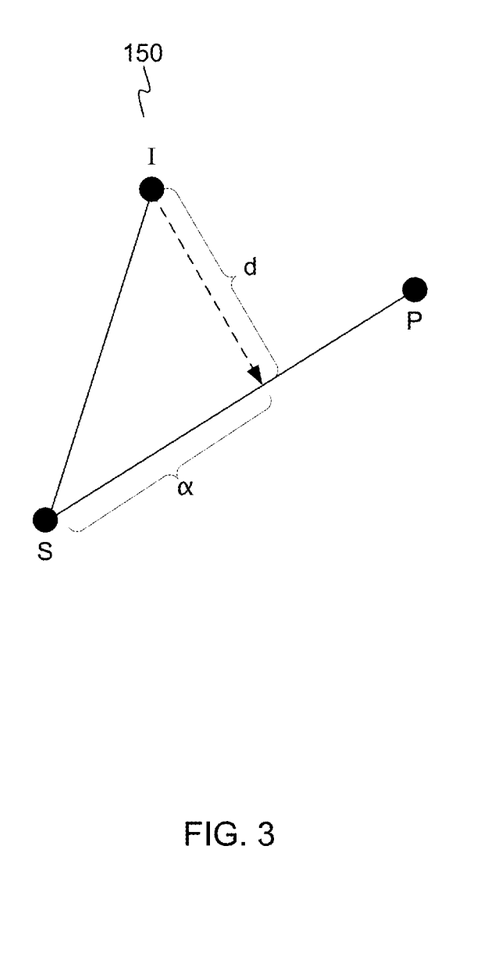
FIG. 3 shows a prior on the perpendicular distance d from a sharp pixel's color value to the (3D) line defined by the two colors P (primary) and S (secondary) as well as the blend value $\alpha$.

To apply the concept of a two-color prior model discussed above, the following formulation for this color prior may be.

$$L(I) = -\lambda_1 \|I - [\alpha P + (1 - \alpha) S]\|^\beta - \lambda_2 \rho(\alpha) \tag{6}$$

where P and S are primary and secondary colors, α (also referred to herein as alpha) is the mixing parameter, and θ works well from 0.8 to 2. FIG. 3 shows a prior on the perpendicular distance d from a sharp pixel's color value to the (3D) line defined by the two colors P and S) as well as the blend value α. A second prior is on the distribution of α, i.e. the normalized distance along the line between P and S. The first likelihood term of Equation (6) minimizes the distance between the recovered intensity I and the line defining the space of the two-color model.

The term $\rho(\alpha)$ enforces a prior on α. The hyperlaplacian derived norm mentioned earlier is used, as the residual from an image to its two-color model estimate may also be a zero-peaked distribution. The next paragraph describes one way to solve for these colors. Regarding the alpha prior ($\rho(\alpha)$), which is, the penalty enforcing the prior on alpha (blending between colors), the alpha prior may be derived from something like a beta distribution. An alpha close to 0 or 1 is preferred over a value in between, which favors solutions with sharp edges.

Figure 4:
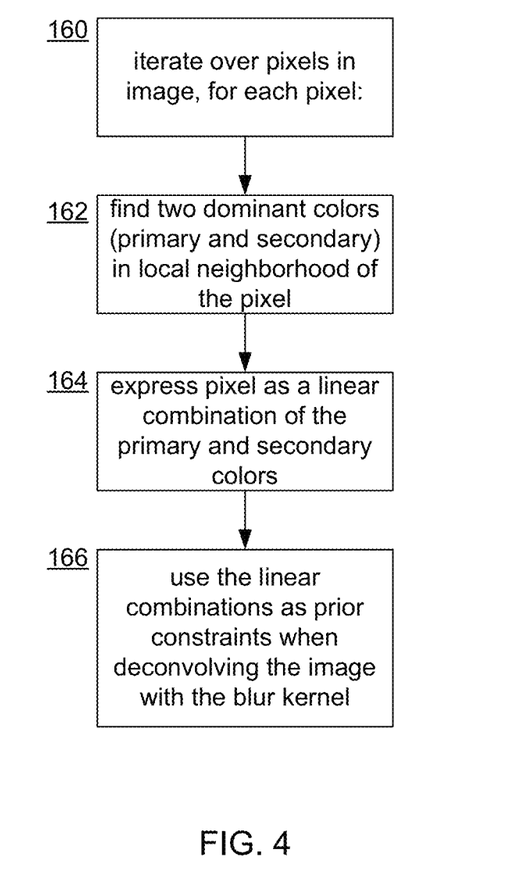
FIG. 4 shows a process for finding and using two colors P and S.

Generally, P and S, for each pixel are solved before deconvolution. FIG. 4 shows a process for finding and using P and S. The process iterates 160 over the pixels in the blurred image (see Bennett et al.; "Video and Image Bayesian Demosaicing with a Two Color Image Prior"; ECCV (1) 2006: 508-521). For a current pixel, the process finds 162 two dominant colors (primary P and secondary S) in a local neighborhood of the pixel. The pixel is expressed as a linear combination of the primary and secondary colors. The linear combinations are then used as a prior to deconvolve the image using a blur kernel. The K-Means process, described in detail elsewhere, can be used to find 162 the dominant colors P and S. For a given pixel of the image, there is a 5×5 window centered on the pixel (different window sizes may be used). For all 25 pixels the goal is to find two clusters of colors (using K-Means with K=2, meaning two clusters). That is, there will be two color distributions (color average groups), one for P, and one for S. To initialize the clusters, two pixels of the 25 are picked randomly. The other of the 25 pixels are assigned to the cluster whose mean color is closest to the pixel. Once all of the pixels have been assigned, the color means are re-estimated based on their member pixels. The process is repeated to move pixels to clusters to which they might now be closer. The process is repeated until the cluster means converge.

While this can suffice to find P and S for each pixel, it is also possible to use expectation maximization to further refine P and S by assigning pixels to clusters proportionally to each cluster's mean color. Several iterations may be performed. This can increase the computation cost and improve the accuracy. In sum, the P and S values for the image's pixels can be found using K-means with possibly a few iterations of expectation maximization. Note also that for some implementations it might be helpful to simply omit pixels that deviate significantly from the mean of the cluster to which they are assigned.

Other methods for finding P and S can be used as well. For deconvolution, what is notable is the use of a two-color prior to constrain the solution, which can be performed regardless of how the prior colors are computed.

Some miscellaneous possible variations follow. To reduce cartooniness or over-sharpening of an image, the alpha prior can be used to weight or shape the middle of the penalty function to vary with edge strength or proximity to an edge (i.e., allow partial alphas if they are next to 0 or 1 alpha values). Deconvolving on a super-resolved grid and then downsampling back to the original resolution might also reduce the cartooniness/over-sharpening affect. For the color model, a cluster can be weighted globally by spatial information. For example, if red is not observed to be physically next to blue anywhere in the image, then even if a pixel can be explained on a line between red and blue, this might nonetheless be prevented in view of the global information. The color model could treat luminance changes and chromaticity changes differently. Chromaticity changes are more likely to be sharp in real images, while luminance changes due to shading on smooth surfaces can be slow due to low-frequency changes in lighting. White-point estimation might be used to help disambiguate shading changes from chromaticity changes.

Multi-scale oriented filters can be used to regularize over edge orientations. For some images, this might preserve edge continuity. Previous work on isophote smoothness can be used to smooth along the direction of an edge but no across the edge.

CONCLUSION

Figure 5:
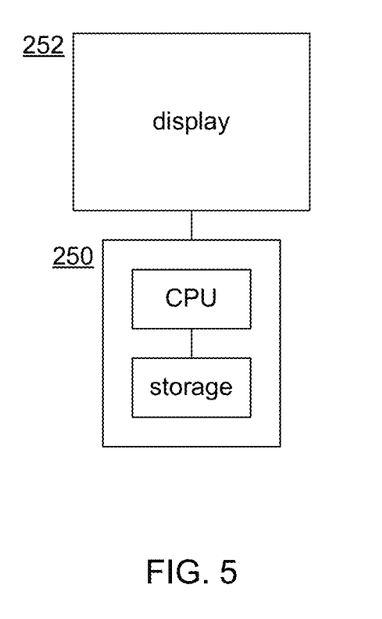
FIG. 5 shows a computing device.

Explained above are techniques for deblurring an image. The techniques may be implemented on one or more computing devices such as shown in FIG. 5. A computing device 250 may have a CPU and storage and may provide video output to a display 252. The computing device 250 may communicate via a network. Embodiments and features of the approaches discussed above can be realized in the form of information stored in volatile or non-volatile computer or device readable media (for example the storage of computing device 250). This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded, possibly compiled or interpreted, and executed. The embodiments and features can be performed on any type of computing device, including portable devices, digital cameras, workstations, servers, mobile wireless devices, and so on.

The invention claimed is:

1. A device implemented method of using deconvolution to deblur a blurred digital image, the device comprising a processor and memory storing the blurred digital image, the method comprising:

computing, by the processor, a local two-color model of the blurred digital image, the two-color model stored in the memory and modeling the pixels of the blurred digital image as respective local combinations of two colors, the two-color model comprising a model such that, for a given pixel, the given pixel is modeled as a combination of two colors local to the given pixel in the blurred image;

generating, by the processor, a deblurred image stored in the memory and corresponding to the blurred digital image by deconvolving the blurred digital image with a blur kernel using the two-color model as a prior to constrain the deconvolution.

2. A device implemented method according to claim 1, wherein the two-color model is obtained by computing, by the processor, color statistics of pixels in local neighborhoods of the blurred digital image's pixels.

3. A device implemented method according to claim 2, wherein the two colors corresponding to a given pixel of the blurred digital image comprise a primary and a secondary color, wherein the primary and secondary colors comprise dominant colors of the given pixel's local neighborhood.

4. A device implemented method according to claim 3, wherein the two colors of the given pixel are statistically derived from corresponding clusters of pixels in the given pixel's neighborhood.

5. A device implemented method according to claim 1, wherein the two-color model models the blurred digital image by representing pixels of the blurred digital image as respective linear combinations of two colors derived from the blurred digital image.

6. A device implemented method according to claim 1, wherein the deblurred image, if convolved with the blur kernel with noise added, will produce a blurred digital image that satisfies the two-color model.

7. A device implemented method according to claim 1, further comprising estimating a spatially-varying noise level of the blurred digital image and using the noise level when performing the deconvolution.

8. One or more computer readable storage media storing information to enable a device to perform a process, wherein the media does not comprise a signal, the process comprising:
receiving an input image and deriving from the input image color pairs each comprising a primary color and a secondary color, where different color pairs correspond to different pixels of the image;
for the pixels of the image, representing a pixel as a linear combination of the pixel's corresponding primary and secondary colors; and
producing a sharp image by deconvolving the input image with a blur kernel using the linear combinations as a color prior to constrain the sharp image when deconvolving the input image.

9. One or more computer readable storage media according to claim 8, wherein the deconvolution is performed using a known blur kernel.

10. One or more computer readable storage media according to claim 9, wherein the deconvolution comprises a maximum a posteriori (MAP) estimation technique to find a most likely estimate for the input image's sharp image.

11. One or more computer readable storage media according to claim 10, wherein the linear combination of a pixel comprises an alpha blending function.

12. One or more computer readable storage media according to claim 8, wherein the color prior penalizes potential solutions of the deconvolution independent of the magnitudes of edges in the input image.

13. One or more computer readable storage media according to claim 8, wherein a pixel is penalized in the deconvolution in accordance with its distance from a line in color space between the pixel's primary and secondary color.

14. A device comprising a CPU and storage configured to enable the CPU to perform a process, the process comprising:
receiving a first image and computing a color model of the first image by analyzing local neighborhoods of pixels in the first image; and
using the color model as a prior when deconvolving the first image with a blur kernel to produce a de-blurred image analogue of the input image, wherein the blur kernel comprises a kernel that if convolved with the first image will produce a second image comprising a blurry version of the first image, wherein the color model comprises a two-color model based on color distributions in the second image, where the two-color model comprises a Per-pixel linear combination of two color layers derived from the second image, and wherein the two-color model is as a prior to which a solution of the deconvolution is constrained.

15. A device according to claim 14, wherein the blur kernel comprises a shift-invariant kernel.

16. A device according to claim 14, wherein the prior comprises a probability distribution function.

17. A device according to claim 14, the process further comprising using local oriented filters to regularize edge orientations in the first image.

18. A device according to claim 14, wherein the model models a given pixel of the first image as a linear combination of two colors derived from color values of pixels in a local neighborhood of the given pixel.

19. A device according to claim 14, wherein the image colors of the color model are weighted according to probabilities in a global RGB histogram of the first image.

20. A device according to 14, wherein the color model is computed by recovering a global set of colors of the first image and for each pixel in a set of pixels in the first image, modeling the pixel with two of the colors in the global set whose linear combination best matches the color of the pixel.

21. A method according to claim 1, wherein for a given pixel of the blurred image, the pixel comprising a color value, a probability of the given pixel is measured as a deviation of the color value from the two-color model.

* * * * *